US011048908B2

(12) United States Patent
Zhang et al.

(10) Patent No.: US 11,048,908 B2
(45) Date of Patent: Jun. 29, 2021

(54) FINGERPRINT RECOGNITION METHOD AND RELATED PRODUCTS

(71) Applicant: GUANGDONG OPPO MOBILE TELECOMMUNICATIONS CORP., LTD., Guangdong (CN)

(72) Inventors: Haiping Zhang, Guangdong (CN); Yibao Zhou, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 226 days.

(21) Appl. No.: 16/013,637

(22) Filed: Jun. 20, 2018

(65) Prior Publication Data

US 2019/0034695 A1 Jan. 31, 2019

(30) Foreign Application Priority Data

Jul. 31, 2017 (CN) .......................... 201710638168.9

(51) Int. Cl.
*G06K 9/00* (2006.01)
*G06F 3/044* (2006.01)
(Continued)

(52) U.S. Cl.
CPC ......... *G06K 9/00087* (2013.01); *G06F 3/044* (2013.01); *G06F 21/32* (2013.01);
(Continued)

(58) Field of Classification Search
CPC ............. G06K 9/00087; G06K 9/0002; G06K 9/0004; G06K 9/00013; G06K 9/036;
(Continued)

(56) References Cited

U.S. PATENT DOCUMENTS 7,961,917 B2 * 6/2011 Black .................. G06Q 20/341
382/124
2014/0294259 A1 10/2014 Lee
(Continued)

FOREIGN PATENT DOCUMENTS

CN 201638241 U 11/2010
CN 106227437 A 12/2016
(Continued)

OTHER PUBLICATIONS

PCT/CN2018/094591 International Search Report and Written Opinion dated Sep. 27, 2018, 10 pages.
(Continued)

*Primary Examiner* — Solomon G Bezuayehu
(74) *Attorney, Agent, or Firm* — Lathrop GPM LLP

(57) ABSTRACT

Embodiments of the present disclosure provide a fingerprint recognition method and related products. The method may include: acquiring by the mobile terminal a first fingerprint image of a target finger in a first fingerprint recognition mode; verifying whether a first matching degree between the first fingerprint image and a first fingerprint template corresponding to the first fingerprint recognition mode is greater than an enrolled threshold; when the first matching degree is less than or equal to the enrolled threshold, verifying whether a second matching degree between the first fingerprint image and a second fingerprint template corresponding to a second fingerprint recognition mode is greater than the enrolled threshold; when the second matching degree is greater than the enrolled threshold, determining that fingerprint is verified.

13 Claims, 10 Drawing Sheets

(51) Int. Cl.
*G06K 9/03* (2006.01)
*H04L 9/32* (2006.01)
*G06K 9/62* (2006.01)
*G06F 21/32* (2013.01)
*G06K 9/20* (2006.01)
*G06F 21/83* (2013.01)
*H04M 1/02* (2006.01)

(52) U.S. Cl.
CPC ........... *G06F 21/83* (2013.01); *G06K 9/0002* (2013.01); *G06K 9/0004* (2013.01); *G06K 9/00067* (2013.01); *G06K 9/036* (2013.01); *G06K 9/209* (2013.01); *G06K 9/6215* (2013.01); *H04L 9/3231* (2013.01); *H04M 1/0202* (2013.01); *H04M 2250/12* (2013.01)

(58) Field of Classification Search
CPC .. G06K 9/6215; G06K 9/209; G06K 9/00067; G06F 3/044; G06F 21/32; G06F 21/83; H04L 9/3231; H04M 1/0202; H04M 2250/12; H04M 1/67; H04M 1/72577
See application file for complete search history.

(56) References Cited

U.S. PATENT DOCUMENTS

| | | | |
|---|---|---|---|
| 2016/0042166 A1* | 2/2016 | Kang | G06F 21/32 726/7 |
| 2016/0132712 A1 | 5/2016 | Yang et al. | |
| 2016/0314334 A1* | 10/2016 | He | G06K 9/0004 |
| 2017/0228571 A1* | 8/2017 | Huang | G06K 9/0002 |
| 2017/0344734 A1* | 11/2017 | Zhou | G06K 9/00114 |
| 2018/0007192 A1* | 1/2018 | Tanabe | G06F 3/0484 |
| 2018/0314379 A1* | 11/2018 | Shen | G06K 9/0002 |
| 2019/0018523 A1* | 1/2019 | Xu | G02B 5/30 |
| 2019/0108325 A1* | 4/2019 | Alten | H04L 63/0861 |
| 2020/0092411 A1* | 3/2020 | Xu | H04M 1/72583 |

FOREIGN PATENT DOCUMENTS

| | | |
|---|---|---|
| CN | 106355150 A | 1/2017 |
| CN | 106407952 A | 2/2017 |
| CN | 205942699 U | 2/2017 |
| CN | 106934389 A | 7/2017 |
| CN | 206331449 U | 7/2017 |
| CN | 107480609 A | 12/2017 |
| CN | 107480610 A | 12/2017 |
| JP | 2009099113 A | 5/2009 |
| KR | 20130065041 A | 6/2013 |
| WO | WO 2016121876 A1 | 8/2016 |

OTHER PUBLICATIONS

European Patent Application No. 18181864.2 extended Search and Opinion dated Dec. 12, 2018, 10 pages.
European Patent Application No. 18181864.2 Office Action dated Mar. 27, 2020, 6 pages.
Australian Patent Application No. 2018311739 Office Action dated Jul. 17, 2020, 4 pages.
Indian Patent Application No. 201834024814 Office Action dated Nov. 3, 2020, 7 pages.

* cited by examiner

FINGERPRINT RECOGNITION METHOD AND RELATED PRODUCTS

CROSS-REFERENCE TO RELATED APPLICATIONS

This application is based on and claims priority of Chinese Patent Application No. 201710638168.9, filed on Jul. 31, 2017, the entire contents of which are incorporated herein by reference.

TECHNICAL FIELD

The present disclosure relates to a field of mobile terminals, and more particularly relates to a fingerprint recognition method and related products.

BACKGROUND

With popularization of mobile terminals such as smart phones, tablet computers or the like, almost everyone in modern life owns a mobile phone. In order to ensure security of the mobile phone, typically, a fingerprint recognition is needed for unlocking a screen of the mobile phone to enhance the security. However, during the fingerprint recognition, the user needs to perform an operation of pressing a fingerprint recognition region of the mobile phone with finger pulp of a finger, which has a low success rate of fingerprint recognition in some special cases (for example, the finger is greasy, wet, or peeling).

SUMMARY

Embodiments of the present disclosure provide a fingerprint recognition method and related products.

Embodiments of the present disclosure provide a mobile terminal. The mobile terminal includes a circuitry, a first fingerprint recognition component associated with the circuitry. The first fingerprint recognition component is configured to acquire a first fingerprint image of a target finger in a first fingerprint recognition mode. The circuitry is configured to verify whether a first matching degree between the first fingerprint image and a first fingerprint template is greater than an enrolled threshold, to verify whether a second matching degree between the first fingerprint image and a second fingerprint template is greater than the enrolled threshold when the first matching degree is less than or equal to the enrolled threshold, and to determine that fingerprint is verified when the second matching degree is greater than the enrolled threshold. The first fingerprint template corresponds to the first fingerprint recognition mode and the second fingerprint template corresponds to a second fingerprint recognition mode.

Embodiments of the present disclosure provide a fingerprint recognition method. The method includes: acquiring a first fingerprint image of a target finger in a first fingerprint recognition mode; verifying whether a first matching degree between the first fingerprint image and a first fingerprint template is greater than an enrolled threshold, in which the first fingerprint template corresponds to the first fingerprint recognition mode; verifying whether a second matching degree between the first fingerprint image and a second fingerprint template is greater than the enrolled threshold when the first matching degree is less than or equal to the enrolled threshold, in which the second fingerprint template corresponds to the second fingerprint recognition mode; and determining that fingerprint is verified when the second matching degree is greater than the enrolled threshold.

Embodiments of the present disclosure provide a computer readable storage medium having computer programs for exchanging digital data stored thereon, in which the computer programs are configured to cause a computer to perform all or a part of acts of the method according to the second aspect of embodiments of the present disclosure.

BRIEF DESCRIPTION OF THE DRAWINGS

In order to make the technical solutions of embodiments of the present invention more clearly, the accompanying drawings used in the description of embodiments of the present invention are briefly described herein. Obviously, the described drawings are merely some embodiments of present invention. For persons skilled in the art, other drawings may be obtained based on these drawings without any creative work.

DETAILED DESCRIPTION

The technical solutions in embodiments of the present invention are hereinafter described clearly and completely with reference to accompanying drawings in embodiments of the present invention. Apparently, embodiments described are a part of embodiments of the present invention, but not all embodiments. All other embodiments obtained by those skilled in the art based on the embodiments in the present invention without creative labor shall fall in the protection scope of the present invention.

Terms such as "first", "second" and the like used in the specification, in claims and in drawings are configured herein for distinguishing different subjects, but not for showing a particular sequence. Furthermore, the terms such as "include", "comprise" and any other variations thereof are intended to be non-exclusive. For example, a process, a method, a system, a product or a device including or comprising a sequence of blocks or units is not limited to include or comprise the listed blocks or unit, instead, they alternatively further include or comprise other blocks and units that are not listed or alternatively further include inherent blocks or units of the process, the method, the system, the product or the device.

Term such as "embodiments" referred in the present disclosure means that, particular features, structures and characteristics described in combination with embodiments may be covered in at least one embodiment of the present disclosure. Usages of the term for many times in the specification are not necessary to refer to a same embodiment or same embodiments, and they are not independent embodiments mutually exclusive with other embodiments or unimportant embodiments. It may be explicitly or implicitly understood by those skilled in the art that, embodiments described herein can be combined with other embodiments.

The mobile terminal described in embodiments of the present disclosure may include various devices having a wireless communication function, such as a portable device, a vehicle-mounted device, a wearable device, a computing device or other processing device connected to a wireless modem, various forms of user equipments (UEs), mobile stations (MSs), terminal devices and the like. For ease of description, the above-mentioned devices are collectively referred to as mobile terminals.

Embodiments of the present disclosure will be described in detail below.

Figure 1A:
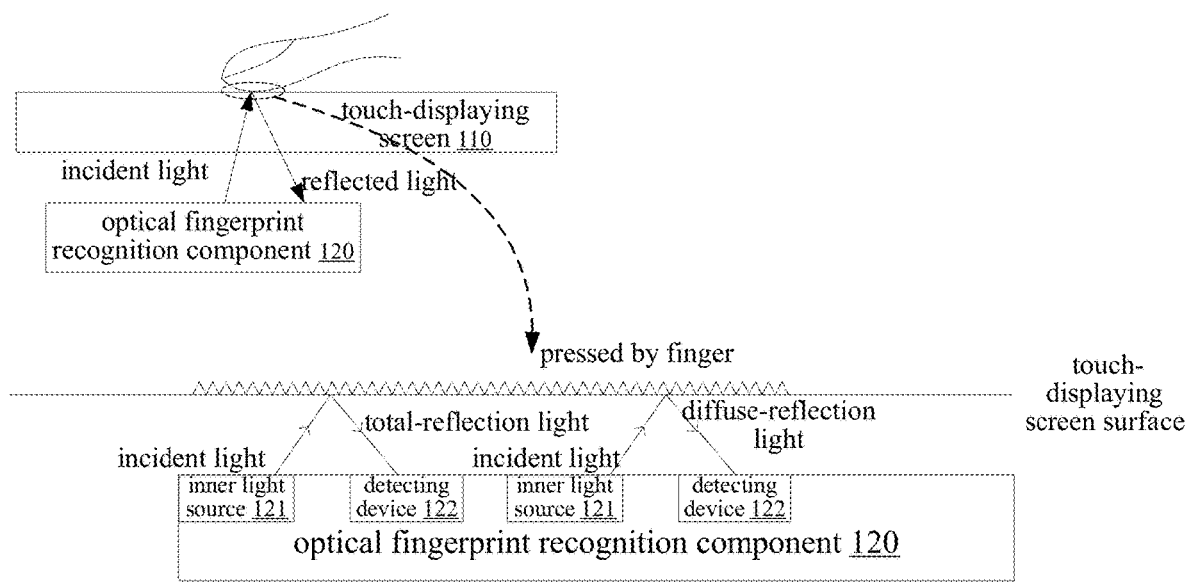
FIG. 1a is a schematic diagram illustrating an operating principle of an optical fingerprint recognition component according to an embodiment of the present disclosure.

In order to have a better understanding of the embodiments of the present disclosure, operating principles of an optical fingerprint recognition and a capacitive fingerprint recognition provided by embodiments of the present disclosure will be described in detail firstly. Referring to FIG. 1a, FIG. 1a is a schematic diagram illustrating an operating principle of an optical fingerprint recognition component according to an embodiment of the present disclosure. As illustrated in FIG. 1a, a touch-displaying screen 110 and an optical fingerprint recognition component 120 are included. The optical fingerprint recognition component 120 includes an inner light source 121 and a detecting device 122. The detecting device 122 may be a charge couple device (CDD) array. The optical fingerprint recognition component 120 may include at least one inner light source 121 and at least one detecting device 122. The inner light source 121 may emit incident light. The incident light may be reflected at a region where a touch-displaying screen surface is in contact with a finger. The reflected light is received by the detecting device 122 and converted to electric signal data. The optical fingerprint recognition component 120 may identify the incident light in contact with bulge portions of the fingerprint (ridges of the fingerprint) and the incident light in contact with sunken portions of the fingerprint (valleys of the fingerprint) according to a total reflection principle.

Referring to an enlarged area indicated by the dotted line in FIG. 1a, the ridges of the fingerprint are in contact with the touch-displaying screen surface, while the valleys of the fingerprint are not in contact with the touch-displaying screen surface. When the incident light generated by the optical fingerprint recognition component 120 is emitted on the valleys of the fingerprint, the incident light is emitted on a surface of the touch-displaying screen in contact with air. In this case, by designing an incident angle of the incident light, the incident light can be totally reflected (a refractive index of material of the touch-displaying screen is greater than 1, a refractive index of air is approximately equal to 1, i.e., it is required to set the refractive index of the material of the touch-displaying screen greater than the refractive index of air). Thus, the optical fingerprint recognition component 120 may receive total-reflection light with a high intensity. When the incident light generated by the optical fingerprint recognition component 120 is emitted on the ridges of the fingerprint, the incident light is emitted on a surface of the touch-displaying screen in contact with the bulge portions of the fingerprint. In this case, the incident light is emitted on the bulge portions of the finger and a diffuse reflection occurs. Thus, the optical fingerprint recognition component 120 may receive diffuse-reflection light with a low intensity. The optical fingerprint recognition component 120 may form a fingerprint image according to the intensity of the received light.

Figure 1B:
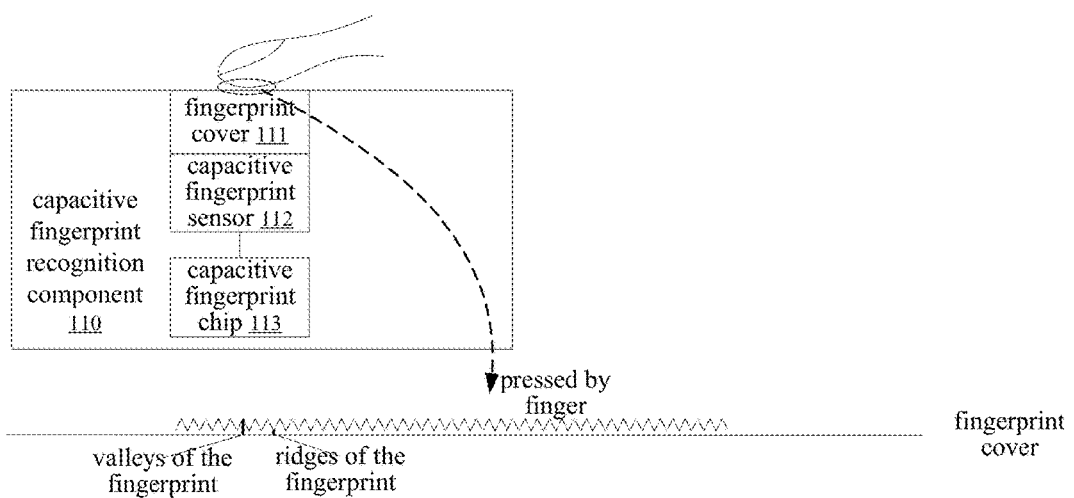
FIG. 1b is a schematic diagram illustrating an operating principle of a capacitive fingerprint recognition component according to an embodiment of the present disclosure.

Referring to FIG. 1b, FIG. 1b is a schematic diagram illustrating an operating principle of a capacitive fingerprint recognition component according to an embodiment of the present disclosure. As illustrated in FIG. 1b, the capacitive fingerprint recognition component 110 includes a fingerprint cover 111, a capacitive fingerprint sensor 112 and a capacitive fingerprint chip 113. The capacitive fingerprint sensor 112 is configured to detect capacitance between bulge portions of the fingerprint (ridges of the fingerprint) and the fingerprint cover 111 and to detect capacitance between sunken portions of the fingerprint (valleys of the fingerprint) and the fingerprint cover 111. Since the ridge of the fingerprint and the valley of the fingerprint have different distances from the fingerprint cover 111, the capacitance between the ridges of the fingerprint and the fingerprint cover 111 is different from the capacitance between the valleys of the fingerprint and the fingerprint cover 111 due to a principle of parallel capacitors. After a finger presses on the fingerprint cover 111, the capacitive fingerprint sensor 112 can detect capacitance distribution on the fingerprint cover 111, and the capacitive fingerprint chip 113 can generate a fingerprint image according to the capacitance distribution on the fingerprint cover 111 detected by the capacitive fingerprint sensor 112.

Both of the fingerprint recognition modes illustrated in FIG. 1a and FIG. 1b can be applied to a mobile terminal. The fingerprint recognition according to embodiments of the present disclosure is applicable to screen unlocking, mobile payment or other scenes requiring a security authentication.

Figure 1C:
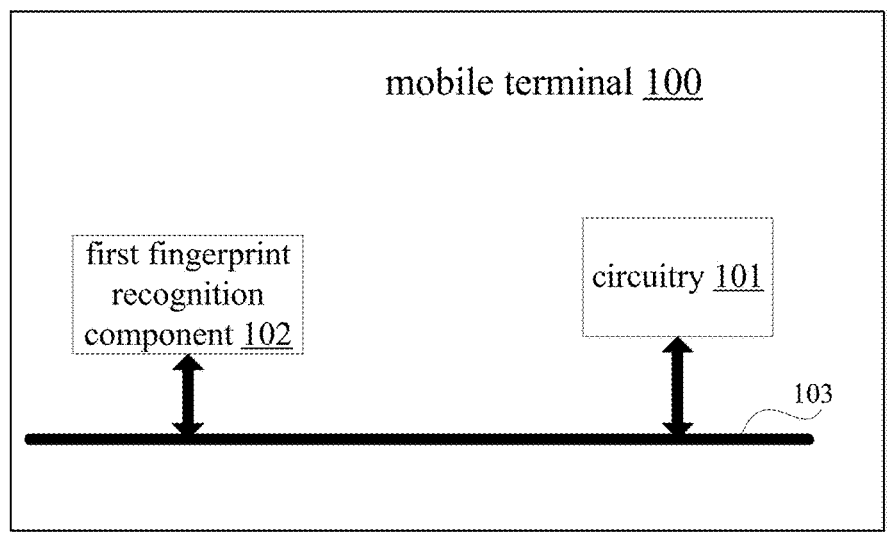
FIG. 1c is a structure diagram of a mobile terminal according to an embodiment of the present disclosure.

Referring to FIG. 1c, FIG. 1c is a structure diagram of a mobile terminal according to an embodiment of the present disclosure. As illustrated in FIG. 1c, the mobile terminal 100 includes a circuitry 101, such as an application processor (AP), an integrated circuit or the like, and a first fingerprint recognition component 102. The circuitry 101 is associated with the first fingerprint recognition component 102 via a bus 103, for example, the circuitry 101 is coupled to the first fingerprint recognition component 102 via a bus 103.

The first fingerprint recognition component 102 is configured to acquire a first fingerprint image of a target finger in a first fingerprint recognition mode.

Figure 1D:
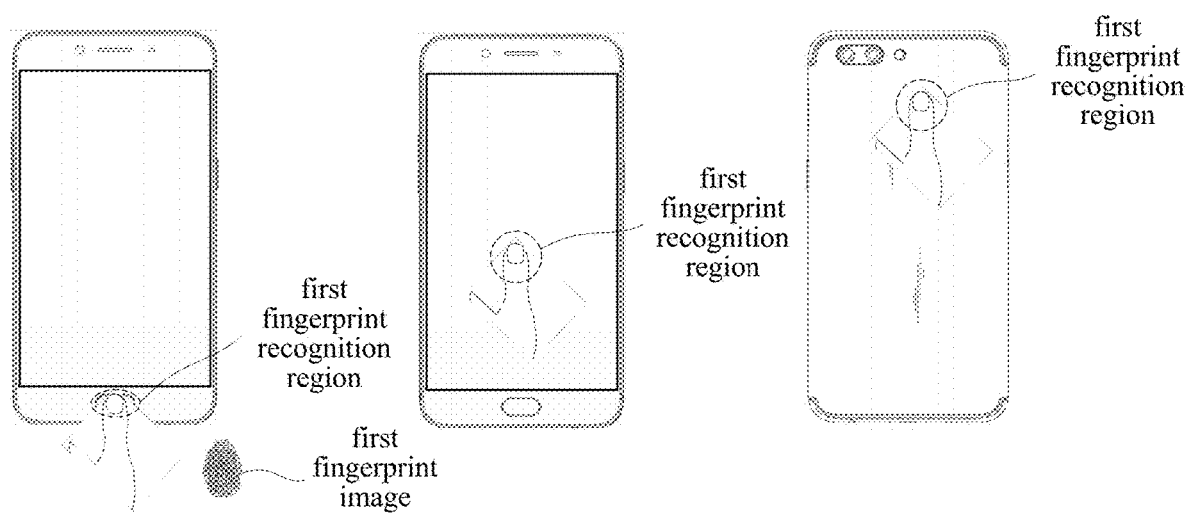
FIG. 1d is a schematic diagram illustrating a fingerprint recognition region according to an embodiment of the present disclosure.

In an embodiment of the present disclosure, when a fingerprint collecting instruction is received, a user may press a finger in a first fingerprint recognition region. The first fingerprint recognition component 102 acquires the first fingerprint image in the first fingerprint recognition region in the first fingerprint recognition mode. The first fingerprint recognition region may be located on a front cover (including a displaying area and a non-displaying area) or a rear cover of the mobile terminal 100. A shape of the first fingerprint recognition region may be a circle, an ellipse, a quadrangle (such as a rectangle), a shape like the fingerprint of the finger and so on, which will not be limited herein. FIG. 1*d* is a schematic diagram illustrating a fingerprint recognition region according to an embodiment of the present disclosure. At left of FIG. 1*d*, the first fingerprint recognition region is located in the non-displaying area. In the middle of FIG. 1*d*, the first fingerprint recognition region is located in the displaying area (displaying screen). At right of FIG. 1*d*, the first fingerprint recognition region is located on the rear cover. The first fingerprint recognition mode may be the optical fingerprint recognition mode or the capacitive fingerprint recognition mode. As illustrated in FIG. 1*d*, the first fingerprint recognition component 102 can acquire the first fingerprint image in the first fingerprint recognition region.

The circuitry 101 is configured to verify whether a first matching degree between the first fingerprint image and a first fingerprint template corresponding to the first fingerprint recognition mode is greater than an enrolled threshold, to verify whether a second matching degree between the first fingerprint image and a second fingerprint template corresponding to the second fingerprint recognition mode is greater than the enrolled threshold when the first matching degree is less than or equal to the enrolled threshold, and to determine that fingerprint is verified successfully when the second matching degree is greater than the enrolled threshold.

In an embodiment of the present disclosure, the fingerprint template is generated according to fingerprint feature information extracted from one or more fingerprint images acquired previously.

When the circuitry 101 verifies whether the first matching degree between the first fingerprint image and the first fingerprint template is greater than the enrolled threshold, the circuitry 101 is configured to extract a fingerprint feature from the first fingerprint image, and to verify whether a matching degree between the extracted fingerprint feature and the first fingerprint template is greater than an enrolled threshold. When the first matching degree is greater than the enrolled threshold, the circuitry 101 determines that the matching is successful and that fingerprint is verified successfully, such that operations such as screen unlocking, payment can be performed. When the first matching degree is less than or equal to the enrolled threshold, the circuitry 101 determines that the matching is failed. In an embodiment, when the first matching degree is less than or equal to the enrolled threshold, the first fingerprint recognition component 102 continues to acquire the first fingerprint image. The circuitry 101 continues to match the first fingerprint image and the first fingerprint template. In another embodiment, when the first matching degree is less than or equal to the enrolled threshold, the circuitry 101 continues to verify whether the second matching degree between the first fingerprint image and the second fingerprint template is greater than the enrolled threshold. When the second matching degree is greater than the enrolled threshold, the circuitry 101 determines that the matching is successful and that fingerprint is verified successfully, such that operations such as screen unlocking, payment can be performed.

In an embodiment of the present disclosure, the second fingerprint recognition mode is different from the first fingerprint recognition mode. The target finger refers to a finger of which the fingerprint is recorded by the user. When it is determined that the first fingerprint image of the target finger acquired in the first fingerprint recognition mode does not match the first fingerprint template corresponding to the first fingerprint recognition mode, it is determined whether the first fingerprint image and the first fingerprint template are matched is performed by using the second fingerprint template corresponding to the second fingerprint recognition mode.

When the mobile terminal illustrated in FIG. 1*c* is implemented, two fingerprint templates corresponding respectively to two fingerprint recognition modes can be used for matching. Compared to the related art, the fingerprint template for fingerprint recognition is multiplied, such that the success rate of fingerprint recognition can be improved.

Figure 1E:
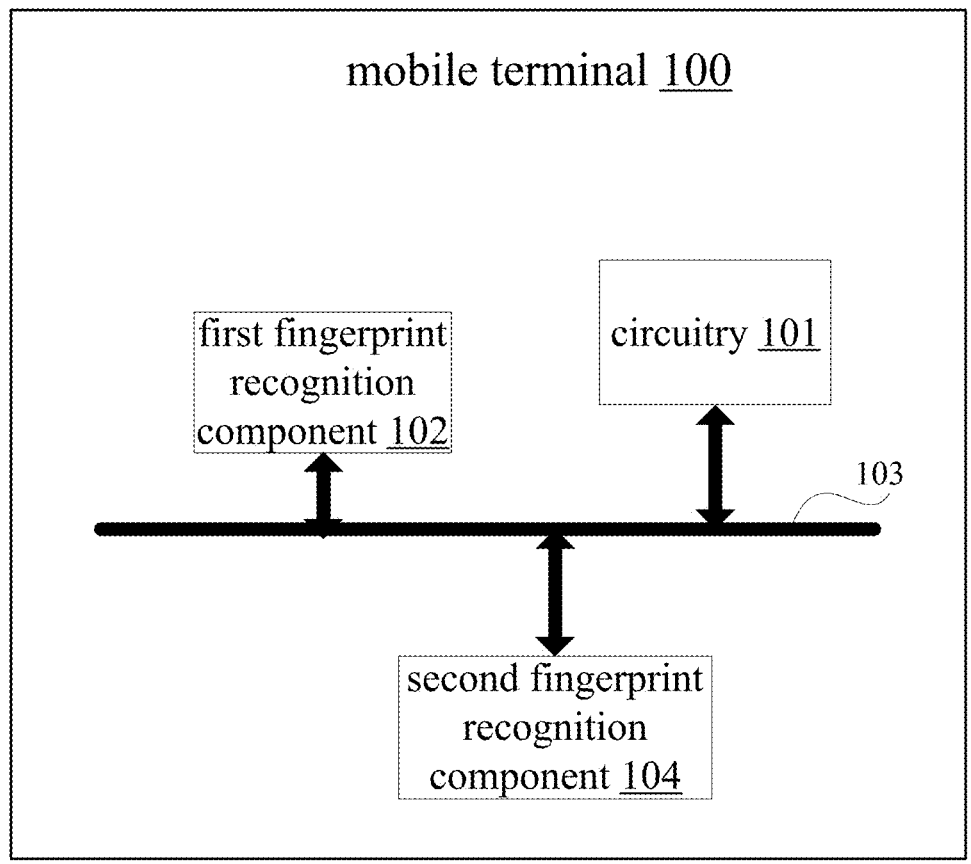
FIG. 1e is a structure diagram of a mobile terminal according to another embodiment of the present disclosure.

In an embodiment, as illustrated in FIG. 1*e*, the mobile terminal 100 further includes a second fingerprint recognition component 104.

The first fingerprint recognition component 102 is further configured to record a first initial fingerprint image of the target finger in the first fingerprint recognition mode.

The circuitry 101 is further configured to generate the first fingerprint template according to the first initial fingerprint image.

The second fingerprint recognition component 104 is configured to record a second initial fingerprint image of the target finger in the second fingerprint recognition mode.

The circuitry 101 is further configured to generate the second fingerprint template according to the second initial fingerprint image.

In an embodiment of the present disclosure, the first fingerprint template is generated according to the first initial fingerprint image of the target finger recorded in the first fingerprint recognition mode, the second fingerprint template is generated according to the second initial fingerprint image of the target finger recorded in the second fingerprint recognition mode. By recording the images of the target finger in the first fingerprint recognition mode and the second fingerprint recognition mode, two kinds of fingerprint templates can be generated, and the two kinds of fingerprint templates can be used for fingerprint recognition and verification subsequently, such that fingerprint objects are added, thus improving the success rate of fingerprint recognition.

Figure 1F:
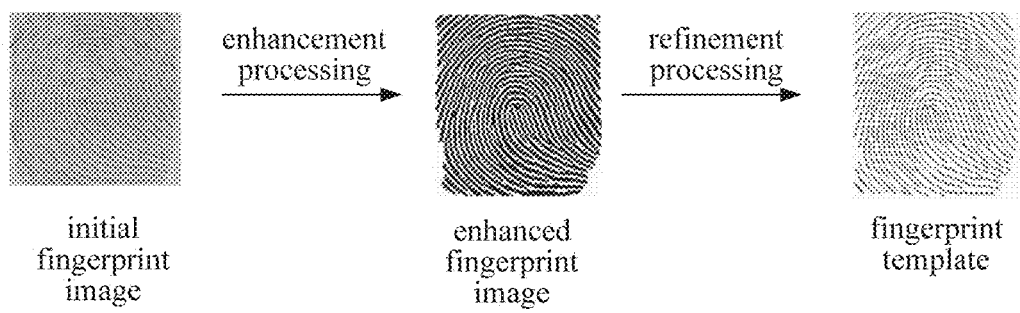
FIG. 1f is a schematic diagram illustrating generation of a fingerprint template according to an embodiment of the present disclosure.

Referring to FIG. 1*f*, FIG. 1*f* is a schematic diagram illustrating generation of a fingerprint template according to an embodiment of the present disclosure. As illustrated in FIG. 1*f*, an initial fingerprint image is subjected to an enhancement processing to obtain an enhanced fingerprint image, and the enhanced fingerprint image is subjected to a refinement processing to obtain a final fingerprint template.

In an embodiment, the second fingerprint recognition component 104 is configured to acquire a second fingerprint image of the target finger in the second fingerprint recognition mode when the second matching degree between the first fingerprint image and the second fingerprint template is less than or equal to the enrolled threshold.

The circuitry 101 is further configured to verify whether a third matching degree between the second fingerprint image and the second fingerprint template is greater than the enrolled threshold, and to determine that fingerprint is verified successfully when the third matching degree is greater than the enrolled threshold.

In an embodiment of the present disclosure, the second fingerprint recognition mode is different from the first fingerprint recognition mode. When it is determined that the second matching degree between the first fingerprint image and the second fingerprint template is less than or equal to the enrolled threshold, i.e., a mismatching occurs for the first fingerprint image, it indicates that the first fingerprint recognition component 102 has a bad fingerprint recognition effect. In this case, the fingerprint recognition mode is switched from the first fingerprint recognition mode to the second fingerprint recognition mode, and the second fingerprint image is acquired in the second fingerprint recognition mode. In an embodiment, the second fingerprint recognition component 104 can acquire the second fingerprint image of the target finger in a second fingerprint recognition region in the second fingerprint recognition mode. The second fingerprint recognition region may be located on a displaying screen, a rear cover or other regions. The second fingerprint recognition region does not overlap with the first fingerprint recognition region.

In an embodiment of the present disclosure, when the circuitry 101 verifies whether the third matching degree between the second fingerprint image and the second fingerprint template is greater than the enrolled threshold, the circuitry 101 can extract a fingerprint feature from the second fingerprint image, and match the fingerprint feature and the second fingerprint template. When the third matching degree is greater than the enrolled threshold, the circuitry 101 determines that the matching is successful and that fingerprint is verified successfully, such that operations such as screen unlocking, payment can be performed. When the third matching degree is less than the enrolled threshold, the circuitry 101 determines that the matching is failed, the second fingerprint recognition component 104 continues to acquire the second fingerprint image, and the circuitry 101 continues to performing the matching on the second fingerprint image and the second fingerprint template.

When the mobile terminal illustrated in FIG. 1e is implemented, the fingerprint recognition mode is switched to the second fingerprint recognition mode automatically if the matching is failed in the case of the first fingerprint recognition mode, such that an appropriate fingerprint recognition mode can be selected for the fingerprint recognition, thus improving the speed of fingerprint recognition.

In an embodiment, the first fingerprint recognition mode is a capacitive fingerprint recognition mode, and the second fingerprint recognition mode is an optical fingerprint recognition mode.

In another embodiment, the first fingerprint recognition mode is an optical fingerprint recognition mode, and the second fingerprint recognition mode is a capacitive fingerprint recognition mode.

Generally, in a situation that the user's finger is dray, the optical fingerprint recognition has a bad recognition effect while the capacitive fingerprint recognition has a good recognition effect. In a situation that the user's finger is wet or greasy, the optical fingerprint recognition has a good recognition effect while the capacitive fingerprint recognition has a bad recognition effect. For example, when the first fingerprint recognition mode is the capacitive fingerprint recognition mode, the second fingerprint recognition mode is the optical fingerprint recognition mode. When the user's finger is wet or greasy, if the capacitive fingerprint recognition mode is used in the beginning, a bad fingerprint recognition effect is caused, such that the matching degree of the fingerprint image is low and it is prone to occurrence of failure matching event. When the occurrence of failure matching event is detected for the capacitive fingerprint image, the optical fingerprint recognition mode is used to acquire an optical fingerprint image and verification is performed on the optical fingerprint image to determine whether the optical fingerprint image is a valid image. However, if the optical fingerprint recognition mode is used in the beginning, it is prone to successful fingerprint recognition.

For another example, when the first fingerprint recognition mode is the optical fingerprint recognition mode, the second fingerprint recognition mode is the capacitive fingerprint recognition mode. When the user's finger is dry, if the optical fingerprint recognition mode is used in the beginning, a bad fingerprint recognition effect is caused, such that the matching degree of the fingerprint image is low and it is prone to occurrence of failure matching event. When the occurrence of failure matching event is detected for the optical fingerprint image, the capacitive fingerprint recognition mode is used to acquire a capacitive fingerprint image and verification is performed on the capacitive fingerprint image to determine whether the capacitive fingerprint image is a valid image. However, if the capacitive fingerprint recognition mode is used in the beginning, it is prone to successfully fingerprint recognition.

Figure 1G:
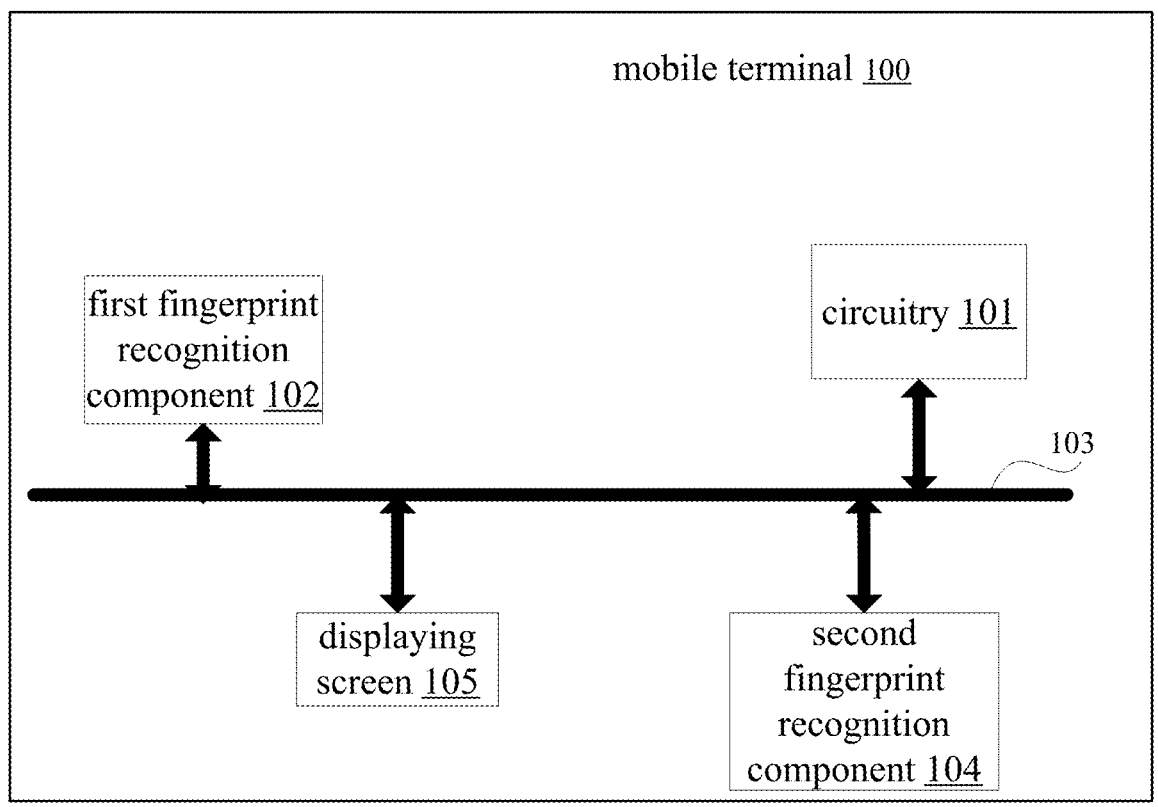
FIG. 1g is a structure diagram of a mobile terminal according to yet another embodiment of the present disclosure.

In an embodiment, as illustrated in FIG. 1g, the mobile terminal further includes a displaying screen 105.

The displaying screen 105 is configured to output prompt information before the second fingerprint recognition component 104 acquires the second fingerprint image in the second fingerprint recognition mode. The prompt information is configured to prompt a user to switch the first fingerprint recognition mode to the second fingerprint recognition mode.

In an embodiment of the present disclosure, when the occurrence of failure matching event is detected for the first fingerprint image, the displaying screen 105 can output the prompt information to prompt the user to switch the first fingerprint recognition mode to the second fingerprint recognition mode. In an embodiment of the present disclosure, when the user uses only one finger to perform the fingerprint recognition (for example, the user puts only one finger in the first fingerprint recognition region and no fingerprint image is detected in the second fingerprint recognition region), the user is prompted to put the finger in the second fingerprint recognition region, such that the mobile terminal can acquire the fingerprint image in the second fingerprint recognition mode. In the embodiment of the present disclosure, the user is prompted to switch the fingerprint recognition mode, such that the user experience can be improved.

In an embodiment, when the second fingerprint recognition region is located on the displaying screen 105, the displaying screen 105 is further configured to highlight the second fingerprint recognition region before the second fingerprint recognition component 104 acquires the second fingerprint image in the second fingerprint recognition region in the second fingerprint recognition mode. Highlighting the second fingerprint recognition region means that the boundary of the second fingerprint recognition region is highlighted, or the boundary of the second fingerprint recognition region flickers, or text information (for example, "please press finger in this region") is shown in the second fingerprint recognition region to prompt the user to press the finger in this region.

Figure 2:
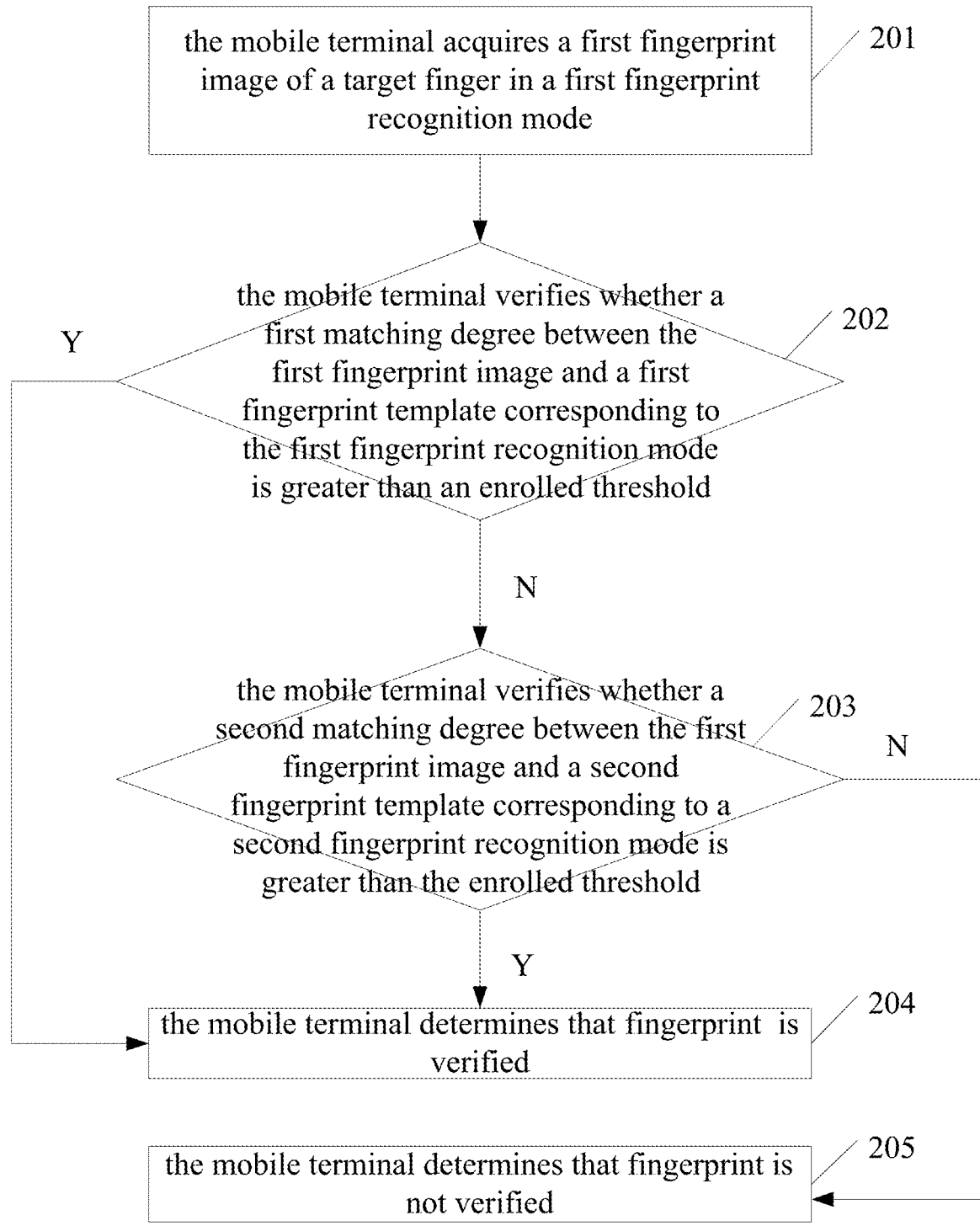
FIG. 2 is a flow chart of a fingerprint recognition method according to an embodiment of the present disclosure.

Referring to FIG. 2, FIG. 2 is a flow chart of a fingerprint recognition method according to an embodiment of the present disclosure. The method is applied in a mobile terminal including a circuitry, a first fingerprint recognition component and a second fingerprint recognition component. As illustrated in FIG. 2, the method includes the following.

At block 201, the mobile terminal acquires a first fingerprint image of a target finger in a first fingerprint recognition mode.

In an embodiment, the mobile terminal can acquire the first fingerprint image of the target finger through the first fingerprint recognition component.

At block 202, the mobile terminal verifies whether a first matching degree between the first fingerprint image and a first fingerprint template corresponding to the first fingerprint recognition mode is greater than an enrolled threshold. If yes, an act at block 204 is executed, otherwise, an act at block 203 is executed.

At block 203, the mobile terminal verifies whether a second matching degree between the first fingerprint image and a second fingerprint template corresponding to a second fingerprint recognition mode is greater than the enrolled threshold. If yes, an act at block 204 is executed, otherwise, an act at block 205 is executed.

At block 204, the mobile terminal determines that fingerprint is verified successfully.

At block 205, the mobile terminal determines that fingerprint is not verified.

In an embodiment, the first fingerprint recognition mode is a capacitive fingerprint recognition mode, and the second fingerprint recognition mode is an optical fingerprint recognition mode.

In another embodiment, the first fingerprint recognition mode is an optical fingerprint recognition mode, and the second fingerprint recognition mode is a capacitive fingerprint recognition mode.

Regarding the implementation of acts in FIG. 2, reference can be made to the device embodiments illustrated in FIG. 1a to FIG. 1g, which is not described herein.

When the method illustrated in FIG. 2 is implemented, the fingerprint templates corresponding respectively to two kinds of fingerprint recognition modes can be used for matching. Compared to the related art, the fingerprint template is multiplied, such that the success rate of fingerprint recognition can be improved.

Figure 3:
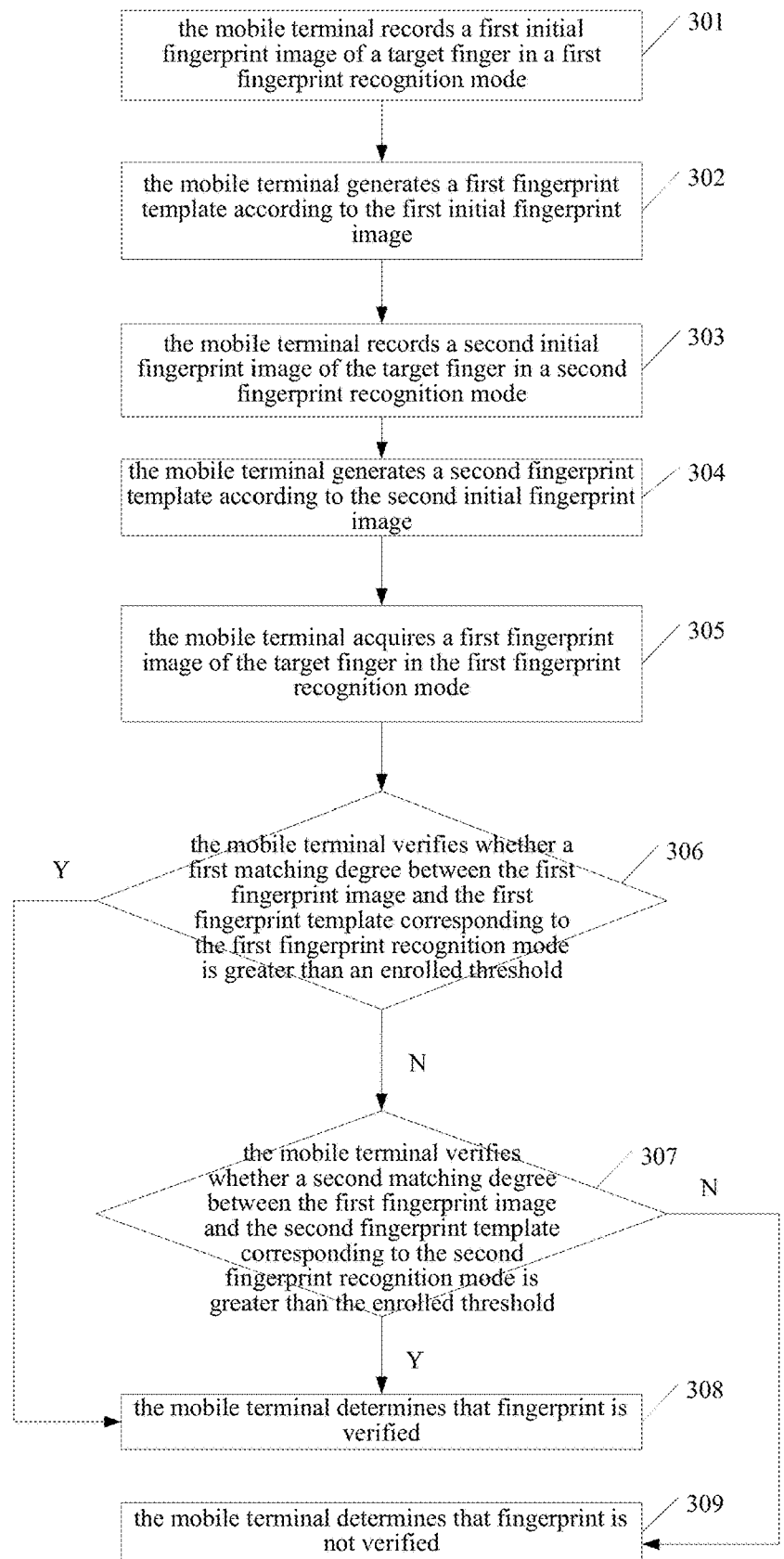
FIG. 3 is a flow chart of a fingerprint recognition method according to another embodiment of the present disclosure.

Referring to FIG. 3, FIG. 3 is a flow chart of a fingerprint recognition method according to another embodiment of the present disclosure. The method is applied in a mobile terminal including a circuitry, a first fingerprint recognition component and a second fingerprint recognition component. As illustrated in FIG. 3, the method includes the following.

At block 301, the mobile terminal records a first initial fingerprint image of a target finger in a first fingerprint recognition mode.

In an embodiment, the mobile terminal can record the first initial fingerprint image of the target finger through the first fingerprint recognition component.

At block 302, the mobile terminal generates a first fingerprint template according to the first initial fingerprint image.

At block 303, the mobile terminal records a second initial fingerprint image of the target finger in a second fingerprint recognition mode.

In an embodiment, the mobile terminal can record the second initial fingerprint image of the target finger through the second fingerprint recognition component.

At block 304, the mobile terminal generates a second fingerprint template according to the second initial fingerprint image.

Acts at blocks 301 and 302 can be executed before or after acts at blocks 303 and 304. Acts at blocks 301-304 are executed before the act at block 305.

At block 305, the mobile terminal acquires a first fingerprint image of the target finger in the first fingerprint recognition mode.

In an embodiment, the mobile terminal can acquire the first fingerprint image of the target finger through the first fingerprint recognition component.

At block 306, the mobile terminal verifies whether a first matching degree between the first fingerprint image and the first fingerprint template corresponding to the first fingerprint recognition mode is greater than an enrolled threshold. If yes, an act at block 308 is executed, otherwise, an act at block 307 is executed.

At block 307, the mobile terminal verifies whether a second matching degree between the first fingerprint image and the second fingerprint template corresponding to the second fingerprint recognition mode is greater than the enrolled threshold. If yes, an act at block 308 is executed, otherwise, an act at block 309 is executed.

At block 308, the mobile terminal determines that fingerprint is verified.

At block 309, the mobile terminal determines that fingerprint is not verified.

Regarding the implementation of acts in FIG. 3, reference can be made to the device embodiments illustrated in FIG. 1a to FIG. 1g, which is not described herein.

When the method illustrated in FIG. 3 is implemented, the fingerprint templates corresponding respectively to two kinds of fingerprint recognition modes can be used for matching. Compared to the related art, the fingerprint template is multiplied, such that the success rate of fingerprint recognition can be improved. The images of the target finger are recorded in the first fingerprint recognition mode and the second fingerprint recognition mode, such that two kinds of fingerprint templates can be generated. When the fingerprint recognition and verification is performed subsequently, the two kinds of fingerprint templates can be used, such that the fingerprint objects are added, thus improving the success rate of fingerprint recognition.

Figure 4:
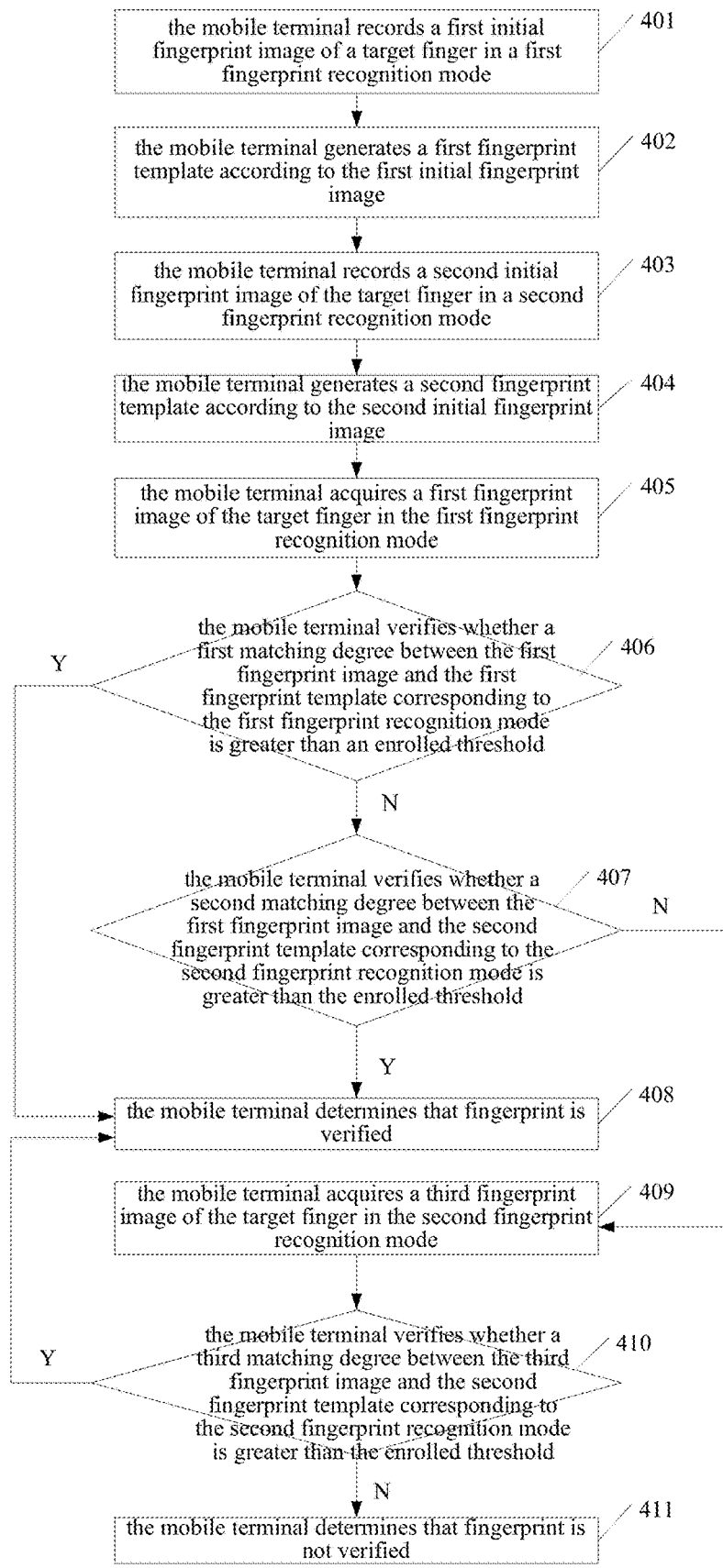
FIG. 4 is a flow chart of a fingerprint recognition method according to yet another embodiment of the present disclosure.

Referring to FIG. 4, FIG. 4 is a flow chart of a fingerprint recognition method according to yet another embodiment of the present disclosure. The method is applied in a mobile terminal including a circuitry, a first fingerprint recognition component and a second fingerprint recognition component. As illustrated in FIG. 4, the method includes the following.

At block 401, the mobile terminal records a first initial fingerprint image of a target finger in a first fingerprint recognition mode.

In an embodiment, the mobile terminal can record the first initial fingerprint image of the target finger through the first fingerprint recognition component.

At block 402, the mobile terminal generates a first fingerprint template according to the first initial fingerprint image.

At block 403, the mobile terminal records a second initial fingerprint image of the target finger in a second fingerprint recognition mode.

In an embodiment, the mobile terminal can record the second initial fingerprint image of the target finger through the second fingerprint recognition component.

At block 404, the mobile terminal generates a second fingerprint template according to the second initial fingerprint image.

Acts at blocks 401 and 402 can be executed before or after acts at blocks 403 and 404. Acts at blocks 401-404 are executed before the act at block 405.

At block 405, the mobile terminal acquires a first fingerprint image of the target finger in the first fingerprint recognition mode.

In an embodiment, the mobile terminal can acquire the first fingerprint image of the target finger through the first fingerprint recognition component.

At block 406, the mobile terminal verifies whether a first matching degree between the first fingerprint image and the first fingerprint template corresponding to the first fingerprint recognition mode is greater than an enrolled threshold. If yes, an act at block 408 is executed, otherwise, an act at block 407 is executed.

At block 407, the mobile terminal verifies whether a second matching degree between the first fingerprint image and the second fingerprint template corresponding to the second fingerprint recognition mode is greater than the enrolled threshold. If yes, an act at block 408 is executed, otherwise, an act at block 409 is executed.

At block 408, the mobile terminal determines that fingerprint is verified.

At block 409, the mobile terminal acquires a second fingerprint image of the target finger in the second fingerprint recognition mode.

In an embodiment, the mobile terminal can acquire the second fingerprint image of the target finger through the second fingerprint recognition component.

At block 410, the mobile terminal verifies whether a third matching degree between the second fingerprint image and the second fingerprint template corresponding to the second fingerprint recognition mode is greater than the enrolled threshold. If yes, an act at block 408 is executed, otherwise, an act at block 411 is executed.

At block 411, the mobile terminal determines that fingerprint is not verified.

Regarding the implementation of acts in FIG. 4, reference can be made to the device embodiments illustrated in FIG. 1a to FIG. 1g, which is not described herein.

When the method illustrated in FIG. 4 is implemented, the fingerprint templates corresponding respectively to two kinds of fingerprint recognition modes can be used for matching. Compared to the related art, the fingerprint template is multiplied, such that the success rate of fingerprint recognition can be improved. When the matching is failed in the case of the first fingerprint recognition mode, the fingerprint recognition mode is switched to the second fingerprint recognition mode automatically, such that an appropriate fingerprint recognition mode can be selected for the fingerprint recognition, thus improving the speed of fingerprint recognition.

Figure 5:
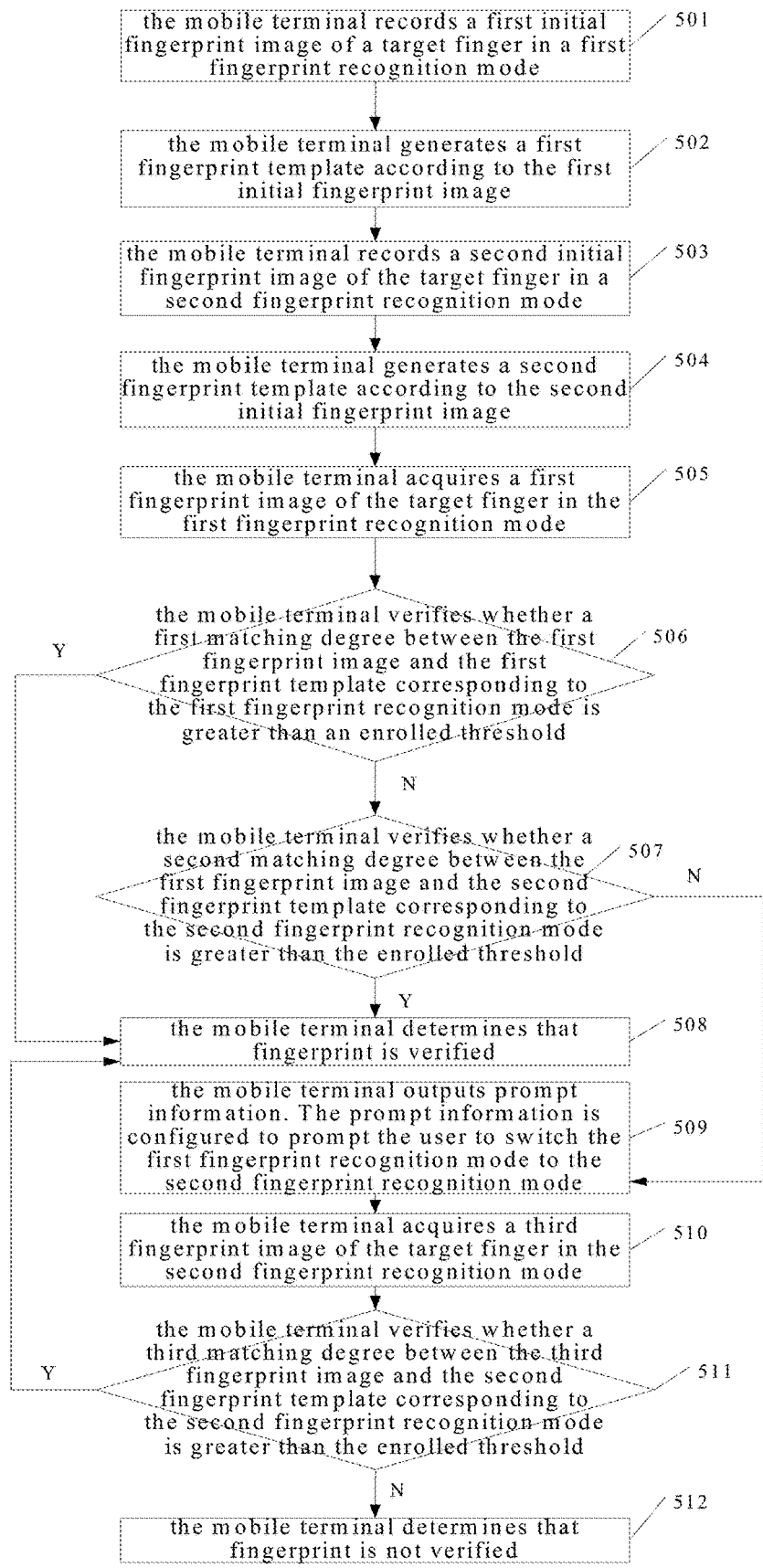
FIG. 5 is a flow chart of a fingerprint recognition method according to a still embodiment of the present disclosure.

Referring to FIG. 5, FIG. 5 is a flow chart of a fingerprint recognition method according to a still embodiment of the present disclosure. The method is applied in a mobile terminal including a circuitry, a first fingerprint recognition component, a second fingerprint recognition component, and a displaying screen. As illustrated in FIG. 5, the method includes the following.

At block 501, the mobile terminal records a first initial fingerprint image of a target finger in a first fingerprint recognition mode.

In an embodiment, the mobile terminal can record the first initial fingerprint image of the target finger through the first fingerprint recognition component.

At block 502, the mobile terminal generates a first fingerprint template according to the first initial fingerprint image.

At block 503, the mobile terminal records a second initial fingerprint image of the target finger in a second fingerprint recognition mode.

In an embodiment, the mobile terminal can record the second initial fingerprint image of the target finger through the second fingerprint recognition component.

At block 504, the mobile terminal generates a second fingerprint template according to the second initial fingerprint image.

Acts at blocks 501 and 502 can be executed before or after acts at blocks 503 and 504. Acts at blocks 501-504 are executed before the act at block 505.

At block 505, the mobile terminal acquires a first fingerprint image of the target finger in the first fingerprint recognition mode.

In an embodiment, the mobile terminal can acquire the first fingerprint image of the target finger through the first fingerprint recognition component.

At block 506, the mobile terminal verifies whether a first matching degree between the first fingerprint image and the first fingerprint template corresponding to the first fingerprint recognition mode is greater than an enrolled threshold. If yes, an act at block 508 is executed, otherwise, an act at block 507 is executed.

At block 507, the mobile terminal verifies whether a second matching degree between the first fingerprint image and the second fingerprint template corresponding to the second fingerprint recognition mode is greater than the enrolled threshold. If yes, an act at block 508 is executed, otherwise, an act at block 509 is executed.

At block 508, the mobile terminal determines that fingerprint is verified.

At block 509, the mobile terminal outputs prompt information. The prompt information is configured to prompt the user to switch the first fingerprint recognition mode to the second fingerprint recognition mode.

In an embodiment, the mobile terminal can output the prompt information through the displaying screen.

At block 510, the mobile terminal acquires a second fingerprint image of the target finger in the second fingerprint recognition mode.

In detail, the mobile terminal can acquire the second fingerprint image of the target finger through the second fingerprint recognition component.

At block 511, the mobile terminal verifies whether a third matching degree between the second fingerprint image and the second fingerprint template corresponding to the second fingerprint recognition mode is greater than the enrolled threshold. If yes, an act at block 508 is executed, otherwise, an act at block 512 is executed.

At block 512, the mobile terminal determines that fingerprint is not verified.

Regarding the implementation of acts in FIG. 5, reference can be made to the device embodiments illustrated in FIG. 1a to FIG. 1g, which is not described herein.

When the method illustrated in FIG. 5 is implemented, the fingerprint templates corresponding respectively to two kinds of fingerprint recognition modes can be used for matching. Compared to the related art, the fingerprint template is multiplied, such that the success rate of fingerprint recognition can be improved. When the matching is failed in the case of the first fingerprint recognition mode, the fingerprint recognition mode is switched to the second fingerprint recognition mode automatically, such that an appropriate fingerprint recognition mode can be selected for the fingerprint recognition, thus improving the speed of fingerprint recognition. In this embodiment of the present disclosure, the prompt information can be outputted to prompt the user to switch the fingerprint recognition mode, such that the user experience can be improved.

Figure 6:
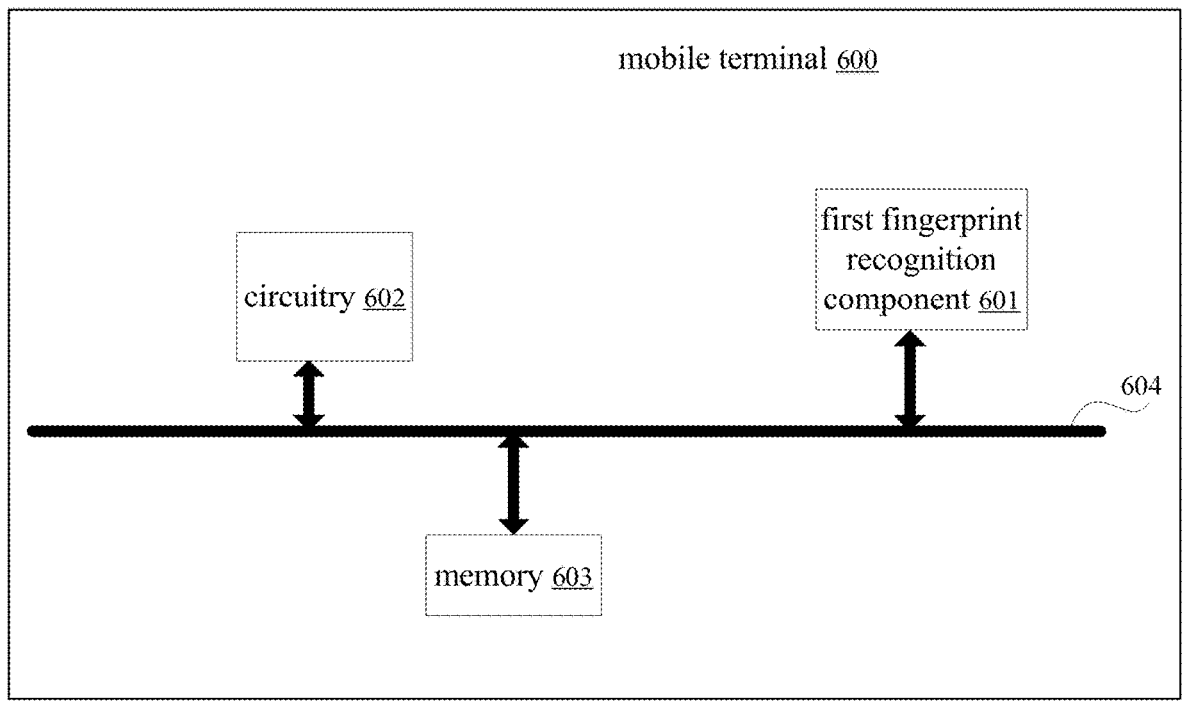
FIG. 6 is a structure diagram of a mobile terminal according to another embodiment of the present disclosure.

Referring to FIG. 6, FIG. 6 is a structure diagram of a mobile terminal according to an embodiment of the present disclosure. The mobile terminal 600 may include a first fingerprint recognition component 601, a circuitry 602, and a memory 603. The first fingerprint recognition component 601, the circuitry 602 and the memory 603 are coupled via a bus 604. The memory 603 is configured to store one or more programs which are configured to be executed by the circuitry 602. The one or more programs include instructions for performing a part or all of method steps illustrated in FIG. 2-FIG. 5.

When the mobile terminal illustrated in FIG. 6 is implemented, two fingerprint templates corresponding respectively to two fingerprint recognition modes can be used for matching. Compared to the related art, the fingerprint template for fingerprint recognition is multiplied, such that the success rate of fingerprint recognition can be improved.

Figure 7:
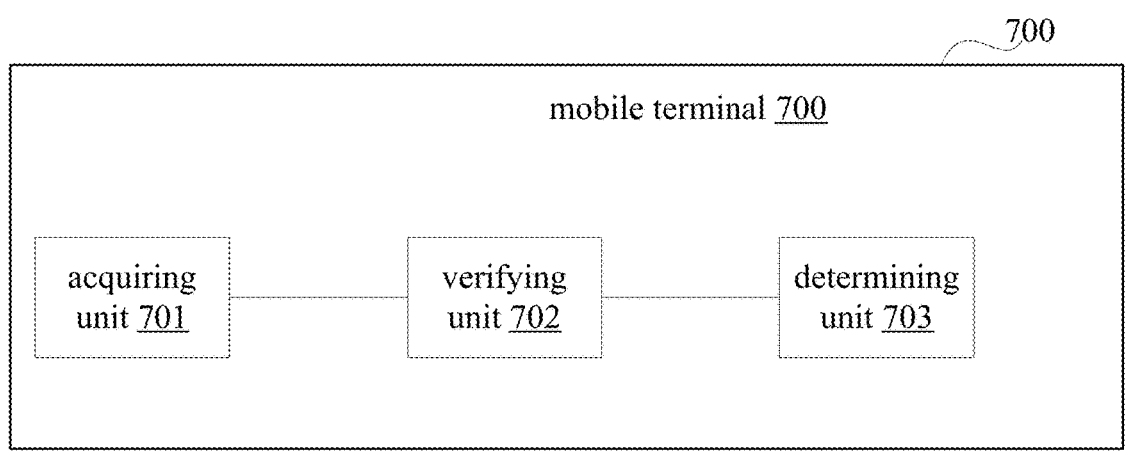
FIG. 7 is a structure diagram of a mobile terminal according to yet another embodiment of the present disclosure.

Referring to FIG. 7, FIG. 7 is a structure diagram of a mobile terminal according to another embodiment of the present disclosure. The mobile terminal 700 includes an acquiring unit 701, a verifying unit 702 and a determining unit 703.

The acquiring unit 701 is configured to acquire a first fingerprint image of a target finger in a first fingerprint recognition mode.

The verifying unit 702 is configured to verify whether a first matching degree between the first fingerprint image and a first fingerprint template is greater than an enrolled threshold, and to verify whether a second matching degree between the first fingerprint image and a second fingerprint template is greater than the enrolled threshold when the first matching degree is less than or equal to the enrolled threshold. The first fingerprint template corresponds to the first fingerprint recognition mode and the second fingerprint template corresponds to the second fingerprint recognition mode.

The determining unit 703 is configured to determine that fingerprint is verified when the second matching degree is greater than the enrolled threshold.

Regarding embodiments of the mobile terminal, reference can be made to the method embodiments illustrated in FIG. 2-Fi. 5, which are not described herein.

When the mobile terminal illustrated in FIG. 7 is implemented, two fingerprint templates corresponding respectively to two fingerprint recognition modes can be used for matching. Compared to the related art, the fingerprint template for fingerprint recognition is multiplied, such that the success rate of fingerprint recognition can be improved.

Figure 8:
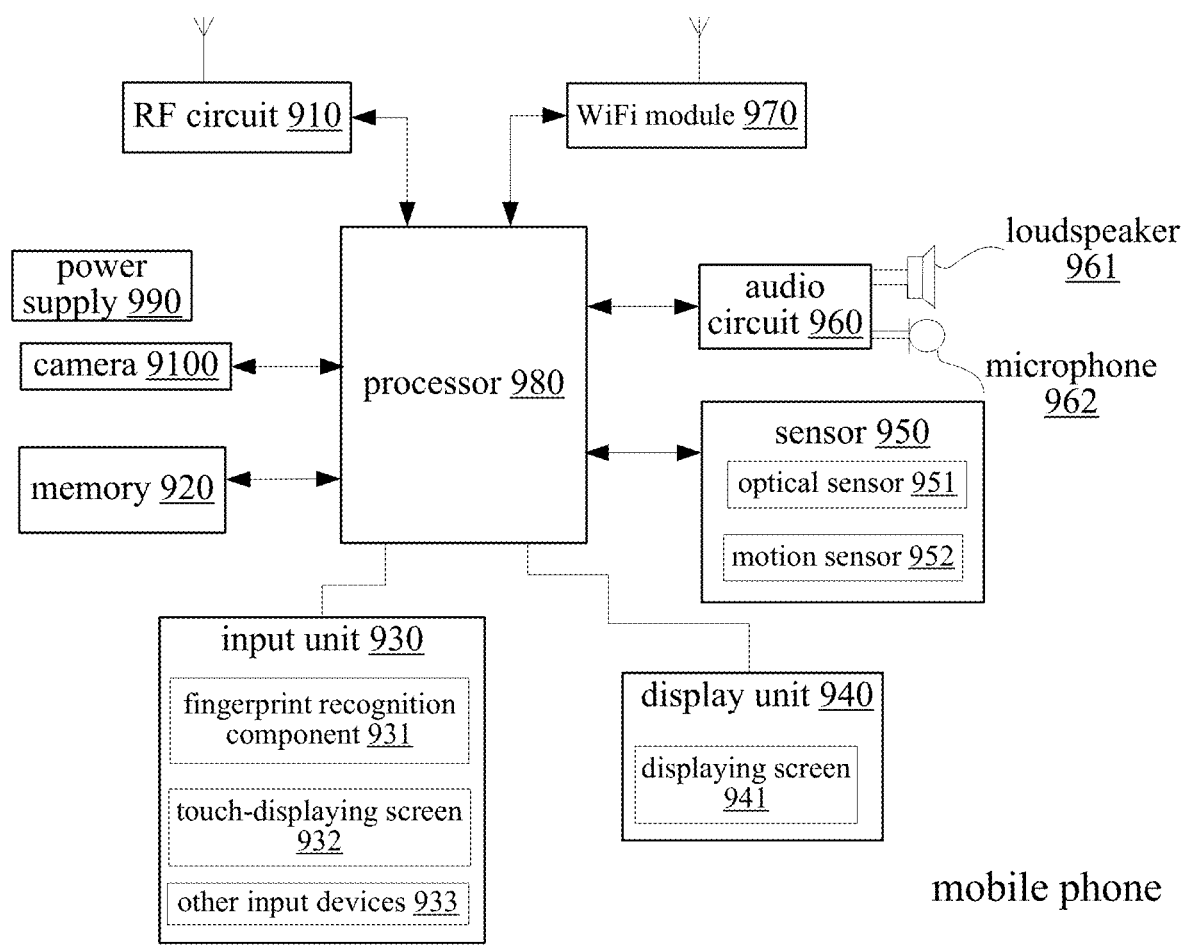
FIG. 8 is a structure diagram of a mobile terminal according to a still embodiment of the present disclosure.

Embodiments of the present disclosure also provide another mobile terminal, as illustrated in FIG. 8. For convenience of description, parts related to embodiments of the present disclosure are illustrated only. Regarding specific technical details which are not disclosed, reference can be made to the description of the method embodiments. The mobile terminal may include a mobile phone, a tablet computer, a personal digital assistant (PDA), a point of sales (POS), a vehicle-mounted computer and the like. The present disclosure takes the mobile phone as an example.

FIG. 8 illustrates a structure diagram of a mobile phone related to the mobile terminal provided by embodiments of the present disclosure. Referring to FIG. 8, the mobile phone may include a radio frequency (RF) circuit 910, a memory 920, an input unit 930, a display unit 940, a sensor 950, an audio circuit 960, a wireless fidelity (WiFi) module 970, a processor 980, and a power supply 990. It will be understood by those skilled in the art that the structure illustrated in FIG. 8 does not constitute a limitation on the mobile phone. Compared to the drawing illustrated, more or fewer components may be included, or a combination of some components or different component arrangements may also be possible.

Respective components of the mobile phone will be described in detail with reference to FIG. 8.

The RF circuit 910 may be configured to receive and send information. Generally, the RF circuit 910 includes, but is not limited to, an antenna, at least one amplifier, a transceiver, a coupler, a low noise amplifier (LNA), a duplexer and the like. In addition, the RF circuit 910 may also communicate with another device by a network and wireless communication. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 920 may be configured to store a software program and modules. The processor 980 runs the software program and modules stored in the memory 920, to implement various functional applications and data processes of the mobile phone. The memory 920 may mainly include a program storage area and a data storage area. The program storage area may store an operating system, an application program required by at least one function and the like. The data storage area may store data created according to usage of the mobile phone, and the like. In addition, the memory 920 may include a high speed random access memory, and may also include a non-volatile memory such as at least one magnetic disk storage device, a flash memory, or another volatile solid-state storage device.

The input unit 930 may be configured to receive input digital or character information, and a key signal input related to user's setup and functional control of the mobile phone. Specifically, the input unit 930 may include a fingerprint recognition component 931 (such as an optical fingerprint recognition component), a touch-displaying screen 932 and other input devices 933. The fingerprint recognition component 931 may acquire fingerprint data inputted by the user thereon. The input unit 930 may also include other input devices 933 besides the fingerprint recognition component 931. Specifically, other input devices 933 may include but not be limited to one or more of a physical button, a functional button (such as a volume control button, an ON-OFF button and the like), a trackball, a mouse and a joystick.

The display unit 940 may be configured to display information input by the user or information provided for the user, and various menus of the mobile phone. The display unit 940 may include a displaying screen 941. Optionally, the displaying screen 941 may be configured by using a liquid crystal display (LCD), an organic light-emitting diode (OLED), or the like. In FIG. 8, although the fingerprint recognition component 931 and the displaying screen 941 may be used as two separate components to realize the input and output function of the mobile phone, in some embodiments, the fingerprint recognition component 931 and the displaying screen 941 may be integrated to realize the input and playing function of the mobile phone.

The mobile phone may further include at least one sensor 950, such as an optical sensor 951, a motion sensor 952 and other sensors. Specifically, the optical sensor 951 may include an ambient light sensor and a proximity sensor. The ambient light sensor can adjust luminance of the displaying screen 941 according to brightness of the ambient light. The proximity sensor may switch off the displaying screen 941 and/or backlight when the mobile phone is moved to the ear. As one type of motion sensor 952, an acceleration sensor can detect acceleration values in various directions (generally on three axes), may detect magnitude and a direction of the gravity when the mobile phone is static, and may be applied to an application that recognizes the attitude of the mobile phone (for example, landscape/portrait screen switching, a related game, and magnetometer attitude calibration), a function related to vibration recognition (such as a pedometer and a knocking), and the like. In addition, the mobile phone can be configured with other sensors, such as a barometer, a hygrometer, a thermometer, and an infrared sensor, which are not further described herein.

The audio circuit 960, a loudspeaker 961, and a microphone 962 may provide audio interfaces between the user and the mobile phone. The audio circuit 960 may convert received audio data into an electrical signal and transmit the electrical signal to the loudspeaker 961. The loudspeaker 961 converts the electrical signal into a sound signal for outputting. On the other hand, the microphone 962 converts a collected sound signal into an electrical signal. The audio circuit 960 receives the electrical signal and converts the electrical signal into audio data, and outputs the audio data to the processor 980 for processing. Then, the processor 980 sends the audio data to, for example, another mobile terminal by using the RF circuit 910, or outputs the audio data to the memory 920 for further processing.

WiFi is a short distance wireless transmission technology. The mobile phone may help, by using the WiFi module 970, the user to receive and send e-mails, browse a webpage, access streaming media, and so on. The WiFi module 970 provides wireless broadband Internet access for the user. Although the WiFi module 970 is illustrated in FIG. 8, it can be understood that, the WiFi module 970 is not essential for the mobile phone, and may be omitted when required as long as the scope of the essence of the present disclosure is not changed.

The processor 980 is a control center of the mobile phone, which can use various interfaces and wires to couple respective parts of the mobile phone, and perform various functions and processing data of the mobile phone by running or executing software programs and/or modules stored in the memory 920 and calling data stored in the memory 920, so as to monitor the mobile phone overall. In an embodiment, the processor 980 may include one or more processing units. In an embodiment, the processor 980 may integrate an application processor and a modem processor, in which the application processor is mainly configured to process the operating system, the user interface and applications, and the modem processor is mainly configured to process wireless communication. It could be understood that the above-described modem processor may be not integrated in the processor 980.

The mobile phone further includes the power supply 990 (such as a battery) for supplying power to the components. In an embodiment, the power supply may be logically coupled with the processor 980 by using a power management system, thereby implementing functions such as charging, discharging and power consumption management by using the power management system.

The mobile phone further includes a camera 9100. The camera 9100 may include a front camera, an iris camera and a rear camera.

Although not illustrated in the figure, the mobile phone may further include a Bluetooth module, a flashlight and the like. The flashlight may include a front flashlight and a rear flashlight. The front flashlight is configured as supplementary lighting for the front camera. The rear flashlight can be configured as supplementary lighting for the rear camera. The front flashlight may include a front visible flashlight and a front infrared flashlight. The front visible flashlight is configured as supplementary lighting for the front camera. The front infrared flashlight is configured as supplementary lighting for the iris camera.

Embodiments of the present disclosure also provide a computer readable storage medium having computer programs for exchanging digital data stored thereon, in which the computer programs are executed to perform all or a part of acts of the method according to the above method embodiments of the present disclosure.

Embodiments of the present disclosure also provide a computer program product including a non-transitory computer-readable medium storing computer programs, in which the computer programs are executed to perform all or a part of acts of the method according to the above method embodiments of the present disclosure.

It should be noted that, for convenience and simplicity of description, the above method embodiments are described in a form of a combination of a series of steps. However, those skilled in the art can understand clearly that, the present disclosure is not limited by the order of the steps, since some steps may be performed simultaneously or in other orders according to present disclosure. In addition, those skilled in the art can understand clearly that, the described embodiments are preferred embodiments, of which relative steps or modules may be unnecessary for the present disclosure.

In above embodiments, each embodiment may be described with focusing on different aspects. Parts not be described in some embodiments may refer to relative descriptions in other embodiments.

It should be understood that, the apparatus disclosed in several embodiments provided by the present disclosure can be realized in any other manner. For example, the apparatus embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit. The integrated units may be implemented in form of hardware, or in form of functional software units.

If the integrated unit is implemented in form of functional software units and are sold or used as separate products, it can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

It should be understood that all or a part of the method provided by the present disclosure may be realized by programs instructing relative hardware, the programs may be stored in a computer-readable memory. The memory may include a flash disk, an ROM, an RAM, a magnet disk, a light disk and the like.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure. Thus, the protection scope of the present disclosure shall be limited by the protection scope of the claims.

What is claimed is:

1. A mobile terminal, comprising a circuitry, and a first fingerprint recognition component associated with the circuitry, wherein, the mobile terminal stores a first fingerprint template and a second fingerprint template generated based on different fingerprint recognition modes;
the first fingerprint recognition component is configured to acquire a first fingerprint image of a target finger in a first fingerprint recognition mode which is one of a capacitive fingerprint recognition mode and an optical fingerprint recognition mode;
the circuitry is configured to verify whether a first matching degree between the first fingerprint image and the first fingerprint template generated based on the first fingerprint recognition mode is greater than an enrolled threshold, to verify whether a second matching degree between the first fingerprint image and the second fingerprint template generated based on a second fingerprint recognition mode which is the other one of the capacitive fingerprint recognition mode and the optical fingerprint recognition mode is greater than the enrolled threshold when the first matching degree is less than or equal to the enrolled threshold;
wherein, the first fingerprint recognition component is further configured to record a first initial fingerprint image of the target finger in the first fingerprint recognition mode;
the circuitry is further configured to generate the first fingerprint template according to the first initial fingerprint image;
the second fingerprint recognition component is configured to record a second initial fingerprint image of the target finger in the second fingerprint recognition mode; and
the circuitry is further configured to generate the second fingerprint template according to the second initial fingerprint image;
wherein the second fingerprint recognition component is further configured to acquire a second fingerprint image of the target finger in the second fingerprint recognition mode when the second matching degree is less than or equal to the enrolled threshold; and
the circuitry is further configured to verify whether a third matching degree between the second fingerprint image and the second fingerprint template is greater than the enrolled threshold, and to determine that fingerprint is verified when the third matching degree is greater than the enrolled threshold.

2. The mobile terminal according to claim 1, wherein, the circuitry is further configured to determine that fingerprint is verified when one of following conditions is met:
the first matching degree being greater than the enrolled threshold; and
the second matching degree being greater than the enrolled threshold.

3. The mobile terminal according to claim 1, wherein, when the circuitry verifies whether a first matching degree between the first fingerprint image and a first fingerprint template is greater than an enrolled threshold, the circuitry is configured to:
extract a fingerprint feature from the first fingerprint image; and
verify whether a matching degree between the extracted fingerprint feature and the first fingerprint template is greater than the enrolled threshold.

4. The mobile terminal according to claim 1, wherein, when the first fingerprint recognition component acquires the first fingerprint image of the target finger in the first fingerprint recognition mode, the first fingerprint recognition component is configured to acquire the first fingerprint image of the target finger within a first fingerprint recognition region in the first fingerprint recognition mode; and
when the second fingerprint recognition component acquires the second fingerprint image of the target finger in the second fingerprint recognition mode, the second fingerprint recognition component is configured to acquire the second fingerprint image of the target finger within a second fingerprint recognition region in the second fingerprint recognition mode;
wherein the first fingerprint recognition region does not overlap with the second fingerprint recognition region.

5. The mobile terminal according to claim 4, further comprising a front cover and a rear cover, wherein,
the first fingerprint recognition region is located on one of the front cover or the rear cover of the mobile terminal and the second fingerprint recognition region is located on the other one of the front cover or the rear cover of the mobile terminal.

6. The mobile terminal according to claim 1, further comprising a displaying screen, wherein,
the displaying screen is configured to output prompt information before the second fingerprint recognition component acquires the second fingerprint image in the second fingerprint recognition mode, wherein the prompt information is configured to prompt a user to switch the first fingerprint recognition mode to the second fingerprint recognition mode.

7. A fingerprint recognition method, applicable to a device stores a first fingerprint template and a second fingerprint template generated based on different fingerprint recognition modes, the method comprising:
acquiring a first fingerprint image of a target finger in a first fingerprint recognition mode which is one of a capacitive fingerprint recognition mode and an optical fingerprint recognition mode;
verifying whether a first matching degree between the first fingerprint image and the first fingerprint template generated based on the first fingerprint recognition mode is greater than an enrolled threshold;
verifying whether a second matching degree between the first fingerprint image and the second fingerprint template generated based on a second fingerprint recognition mode which is the other one of the capacitive fingerprint recognition mode and the optical fingerprint recognition mode is greater than the enrolled threshold when the first matching degree is less than or equal to the enrolled threshold; and
determining that fingerprint is verified when the second matching degree is greater than the enrolled threshold;
wherein before acquiring the first fingerprint image of the target finger in the first fingerprint recognition mode, the method further comprises:
recording a first initial fingerprint image of the target finger in the first fingerprint recognition mode;
generating the first fingerprint template according to the first initial fingerprint image;
recording a second initial fingerprint image of the target finger in the second fingerprint recognition mode; and
generating the second fingerprint template according to the second initial fingerprint image;
the method further comprising:
acquiring a second fingerprint image of the target finger in the second fingerprint recognition mode when the second matching degree is less than or equal to the enrolled threshold;
verifying whether a third matching degree between the second fingerprint image and the second fingerprint template is greater than the enrolled threshold; and
determining that fingerprint is verified when the third matching degree is greater than the enrolled threshold.

8. The method according to claim 7, further comprising:
determining that fingerprint is verified when the first matching degree is greater than the enrolled threshold.

9. The method according to claim 7, wherein, verifying whether a first matching degree between the first fingerprint image and a first fingerprint template is greater than an enrolled threshold comprises:
extracting a fingerprint feature from the first fingerprint image; and
verifying whether a matching degree between the extracted fingerprint feature and the first fingerprint template is greater than the enrolled threshold.

10. The method according to claim 7, wherein,
acquiring the first fingerprint image of the target finger in the first fingerprint recognition mode comprises:
acquiring the first fingerprint image of the target finger within a first fingerprint recognition region in the first fingerprint recognition mode; and
acquiring the second fingerprint image of the target finger in the second fingerprint recognition mode comprises:
acquiring the second fingerprint image of the target finger within a second fingerprint recognition region in the second fingerprint recognition mode;
wherein the first fingerprint recognition region does not overlap with the second fingerprint recognition region.

11. The method according to claim 10, wherein,
the first fingerprint recognition region is located on one of the front cover or the rear cover of the mobile terminal and the second fingerprint recognition region is located on the other one of the front cover or the rear cover of the mobile terminal.

12. The method according to claim 7, wherein before acquiring the second fingerprint image of the target finger in the second fingerprint recognition mode, the method further comprises:
outputting prompt information, wherein the prompt information is configured to prompt a user to switch the first fingerprint recognition mode to the second fingerprint recognition mode.

13. A non-transitory computer readable storage medium having computer programs for exchanging digital data stored thereon, wherein the storage medium stores a first fingerprint template and a second fingerprint template generated based on different fingerprint recognition modes and the computer programs are configured to cause a computer to perform the method, comprising:
acquiring a first fingerprint image of a target finger in a first fingerprint recognition mode which is one of a capacitive fingerprint recognition mode and an optical fingerprint recognition mode;
verifying whether a first matching degree between the first fingerprint image and the first fingerprint template generated based on the first fingerprint recognition mode is greater than an enrolled threshold;
verifying whether a second matching degree between the first fingerprint image and the second fingerprint template generated based on a second fingerprint recognition mode which is the other one of the capacitive fingerprint recognition mode and the optical fingerprint recognition mode is greater than the enrolled threshold when the first matching degree is less than or equal to the enrolled threshold; and
determining that fingerprint is verified when the second matching degree is greater than the enrolled threshold;
wherein before acquiring the first fingerprint image of the target finger in the first fingerprint recognition mode, the method further comprises:
recording a first initial fingerprint image of the target finger in the first fingerprint recognition mode;
generating the first fingerprint template according to the first initial fingerprint image;
recording a second initial fingerprint image of the target finger in the second fingerprint recognition mode; and
generating the second fingerprint template according to the second initial fingerprint image;
the method further comprising:
acquiring a second fingerprint image of the target finger in the second fingerprint recognition mode when the second matching degree is less than or equal to the enrolled threshold;
verifying whether a third matching degree between the second fingerprint image and the second fingerprint template is greater than the enrolled threshold; and
determining that fingerprint is verified when the third matching degree is greater than the enrolled threshold.

* * * * *